W. M. PYLE.
Churn Attachment.

No. 53,484. Patented March 27, 1866.

Witnesses:

Inventor:

UNITED STATES PATENT OFFICE.

WILLIAM M. PYLE, OF GREENSBURG, INDIANA.

IMPROVEMENT IN CHURN ATTACHMENTS.

Specification forming part of Letters Patent No. 53,484, dated March 27, 1866.

*To all whom it may concern:*

Be it known that I, WILLIAM M. PYLE, of Greensburg, in the county of Decatur and State of Indiana, have invented a new and useful Improvement in Attachments to Churns; and I do hereby declare that the following is a full, clear, and exact description thereof, which will enable others skilled in the art to make and use the same, reference being had to the accompanying drawings, forming part of this specification, in which—

Figure 1:
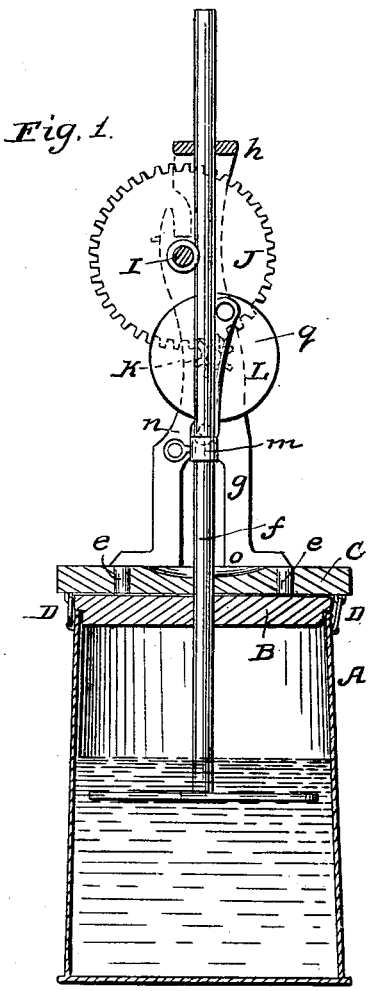
Figure 2:
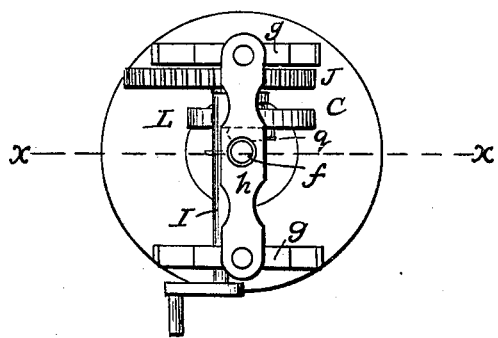

Figure 1 is an elevation of a vertical axial section taken on the line $x$, Fig. 2, of an apparatus made and applied to a churn according to my invention. Fig. 2 is a top view.

The object of this invention is to produce an attachment to be applied to churns, whereby they can be operated with facility; and it consists in a supplementary cover, upon which is supported a train of gearing for working the dasher, the construction of the several parts being such as to combine convenience in attaching the apparatus to a churn with facility in operating it.

A is an ordinary churn, with its cover B and rod $f$, carrying a dasher of any desired construction.

The power required to operate churns of the best construction is so great that many farmers have sought to utilize the strength of the dog and sheep in operating them, although the mechanism required in such cases involves a large expense.

My invention is meant to enable farmers and people of small means to obtain the aid of gearing in operating a churn with a comparatively small outlay of money, and at the same time supply an attachment for driving churns which will be useful to all who have "dog-powers" or similar appliances for utilizing and applying the strength of small animals to domestic and mechanical purposes.

In carrying out my invention, therefore, I leave the churn in its usual condition, but I place upon it a supplementary cover, C, which is supplied at two or more places on its rim with hooks D, which are fitted into eyes fixed on the sides of the churn, in order to make the connection secure. I have also, in this example, made the connection more secure by setting pins $e\ e$ on the top of the cover B of the churn, which project upward into holes made for them in the cover C. The office of the supplementary cover C is to furnish a bed for standards $g\ g$, which rise from its opposite sides and furnish bearings for a horizontal shaft that carries a gear-wheel, J. The shaft is turned by means of a crank, $p$.

Just below the gear J is a pinion, K, fixed on a short shaft running in bearings provided in one of the standards $g$ and in a bracket (not seen) fixed to the same standard. The outer end of the same short shaft carries a crank-wheel, L, to a pin near whose circumference is pivoted a pitman, $q$, that is hinged to a ring or collar, $m$, which clasps the staff $f$ of the dasher. This ring or collar is attached to the staff by a pin, $n$. The upper ends of the standards $g$ are connected by a cap-piece, $h$, through which the staff $f$ is allowed to pass, in order to guide it. The staff also passes centrally through the bed or supplementary cover C, which is made concave at its center to allow the cream and milk which drop from the staff to run back into the churn.

The operation of my invention does not need any particular description. If the crank $p$ is turned, a very rapid rotation is given to the crank-wheel L, and thereby the staff $f$ and its dasher will be rapidly raised and lowered in the churn, effecting a violent agitation of its contents. The rapidity of the motions to be given to the dasher will be determined by the relative sizes of the gearing employed.

If it is desired to use the churn without the power attachment, it is only necessary to remove the pin $n$, when the latter can be raised off the staff.

I claim as new and desire to secure by Letters Patent—

The combination, with the gearing J K, crank $p$, crank-wheel L, frame $g\ h$, and dasher-staff $f$, of the detachable supplementary lid or cover C, hooks D, and pins $e$, substantially as and for the purpose specified.

WILLIAM M. PYLE.

Witnesses:
JOHN F. GOODFILL,
JOHN N. BAXTER.